United States Patent [19]

Hagerty et al.

[11] Patent Number: 5,200,858

[45] Date of Patent: Apr. 6, 1993

[54] UNI-DIRECTIONAL GRADIENT INDEX OF REFRACTION GLASSES

[75] Inventors: James J. Hagerty, Taos, N. Mex.; David N. Pulsifer, San Jose, Calif.; Guy E. Rindone, State College, Pa.

[73] Assignee: LightPath Technologies, Inc., Tucson, Ariz.

[21] Appl. No.: 881,142

[22] Filed: May 11, 1992

Related U.S. Application Data

[63] Continuation of Ser. No. 518,530, May 20, 1990, abandoned, which is a continuation-in-part of Ser. No. 266,670, Nov. 3, 1988, Pat. No. 4,929,065.

[51] Int. Cl.$^5$ .............................................. G02B 1/00
[52] U.S. Cl. ..................................... 359/652; 359/653
[58] Field of Search ............................... 359/652, 653

[56] References Cited

FOREIGN PATENT DOCUMENTS

89/01640  2/1989  European Pat. Off. .
60-237401 11/1985  Japan .

Primary Examiner—Scott J. Sugarman
Attorney, Agent, or Firm—Benman & Collins

[57] ABSTRACT

Tailored glass bodies (10) having a substantial change in index of refraction (a Δn of at least about 0.08 along an axis) are provided. The glass body is characterized by two substantially parallel surfaces, with one surface having a first composition (12t) and the other surface a second composition (12b). The composition of the glass body varies in some predetermined fashion between the two surfaces (12i1–12i8) to provide a predetermined graded index of refraction. A method is also provided to tailor the glass body so that the two compositions have one or more of the following properties substantially constant: thermal coefficient of expansion, glass fusion temperature, Abbé value, and density.

8 Claims, 3 Drawing Sheets

UNI-DIRECTIONAL GRADIENT INDEX OF REFRACTION GLASSES

CROSS-REFERENCE TO RELATED APPLICATION

This application is a continuation of application Ser. No. 07/518,530, filed May 2, 1990, now abandoned, which in turn is a continuation-in-part of application Ser. No. 07/266,670, filed Nov. 3, 1988, now U.S. Pat. No. 4,929,065, issued May 29, 1990.

TECHNICAL FIELD

The present invention relates to glass bodies having a graded index of refraction along one axis, commonly the optic axis, and, more particularly, to fabrication of such bodies and methods for selecting suitable compositions.

BACKGROUND ART

Glass research in the past 25 years has been focused on developing glasses from different and often more exotic materials, and on new methods of formation such as the sol-gel process, in order to extend their use. For example, the emphasis in fiberoptics has been on the purity of silica glass to enable greater signal transmission which is diminished by the light absorption of minor impurities. The emphasis in laser glasses has been to explore new compositions which extend the wavelengths for laser transmission and which will not shatter when exposed to the intensity of the laser beam.

The field of graded glass—glass whose optical, chemical and physical characteristics vary throughout the material in contrast to cladded glasses whose properties change abruptly at their interfaces—is a new science. Considerable effort has been expended by glass scientists to produce glasses with graded properties using techniques such as ion exchange, sol-gel preparation, vapor deposition, and ion implantation but these have been successful only for very thin glasses at best.

For example, the practical limitations for the various prior art processes are as follows:

| Process | Maximum Size | $\Delta n$ |
| --- | --- | --- |
| CVD | 0.1 mm | 0.01 |
| Ion exchange | 10 mm | 0.04 |
| Ion stuffing | 50 mm | 0.04 |
| Sol-gel | 30 mm | 0.1 |

Probably the only significant commercial breakthrough in graded glass has been graded fiberoptics. Because fibers are so thin and the depth of grading (change of refractive index) is so slight, some of the available processes are applicable. However, those processes currently available cannot be used in any large geometry lenses (i.e., camera lenses) or any micro lenses (i.e., compact disk lenses) that require greater or more sophisticated grading.

Glass experts have been convinced that the problems inherent in fabricating graded glass in any significant size or degree of gradation were formidable. The technical barriers were perceived as so great that the scope of research has been limited.

Recently, however, a fabrication process has been developed for producing graded glass which is unfettered by the limitations of earlier processes. The fabrication process, disclosed in U.S. Pat. Nos. 4,883,522 and 4,907,864 and application Ser. No. 07/266,670, now U.S. Pat. No. 4,929,065 involves fusing glasses of varying compositions together to achieve a glass body having a graded index of refraction. The two patents deal with forming bi-directional gradients, starting from frits of different compositions, while the patent application deals with a process for fusing glass plates of different compositions together.

The advantage of graded glass over conventional glass is straight-forward. Since conventional glass is essentially homogeneous, that is, having basically the same characteristics throughout, any optical device requiring a variation of characteristics to solve an optical problem requires a complex system comprised of many glass elements.

Since graded glass can incorporate a mix of many characteristics into one piece of glass, the number of elements can be reduced significantly. Fewer elements means a significant reduction in materials, labor, size of lens housing, and weight. The result is a cheaper, lighter optical device with the same or improved optical characteristics.

The virtues of graded glass not only can improve conventional optical systems, but can improve laser technology and a whole range of applications relating to fiber optic telecommunications, defense, and avionics. Graded glass can also make many new devices commercially viable—such as photonic circuits and solar energy devices.

Earlier processes developed to produce graded glasses are limited both in the characteristics which may be varied and the thickness of the product. The recently-developed fabrication techniques, embodied in the patents and the patent application listed above, allow the grading of numerous characteristics over a wide range of glass sizes. This new technology is expected to spawn a whole new generation of glass products and glass applications.

As this technology develops, new methods are required to enable those skilled in the art to fabricate glass bodies having a desired refractive index graded profile, with certain other properties, such as thermal coefficient of expansion, glass fusion temperature, Abbé value, density, and others, predetermined by choice.

DISCLOSURE OF INVENTION

In accordance with the invention, methods of tailoring glass bodies having an index of refraction graded along one direction, typically the optic axis, are provided. However, applications which utilize gradients in a transverse configuration are also within the scope of the invention, with the optic axis normal to the gradient. Such configurations would be useful, for example, in laser lenses, solar lenses, and head lights for automobiles.

The glass body is characterized by two parallel surfaces, with one surface having a first composition and the other surface a second composition. Along each of the parallel surfaces, the composition is substantially constant. The composition of the glass body varies in some predetermined fashion between the two surfaces to provide a graded index of refraction.

In the fabrication of such glass bodies, a series of compositions intermediate the two end compositions are prepared. The intermediate member compositions are placed between the two end members, and the assembly is heated to a temperature sufficient to fuse the members together. The assembly is maintained at a suitable temperature for a sufficient time to ensure at least partial diffusion of components, thereby at least partially eliminating any structural or compositional interfaces.

The starting material may be in the form of frits (powders) or plates or other suitable form, such as thin sheets on the order of 0.060 inch thick. After a suitable cool-down, the fused mass may then be further processed to form lens blanks, photonic elements, and other optical devices.

It may be desirable to form a fused glass body having a substantially uniform thermal coefficient of expansion from one surface to the other. Or, it may be desired to use end members of similar density. Or, it may be desired to use end members of similar fusion temperature. Or, it may be desired to use end members of similar Abbé number. Glass bodies having a graded index of refraction may be fabricated having one or more of these properties substantially constant from one surface to the other. Finally, the shape of the profile of the refractive index gradient may be predetermined for specific final use, such as linear, quadratic, or other suitable profile.

DESCRIPTION OF THE PREFERRED EMBODIMENTS

Figure 1:
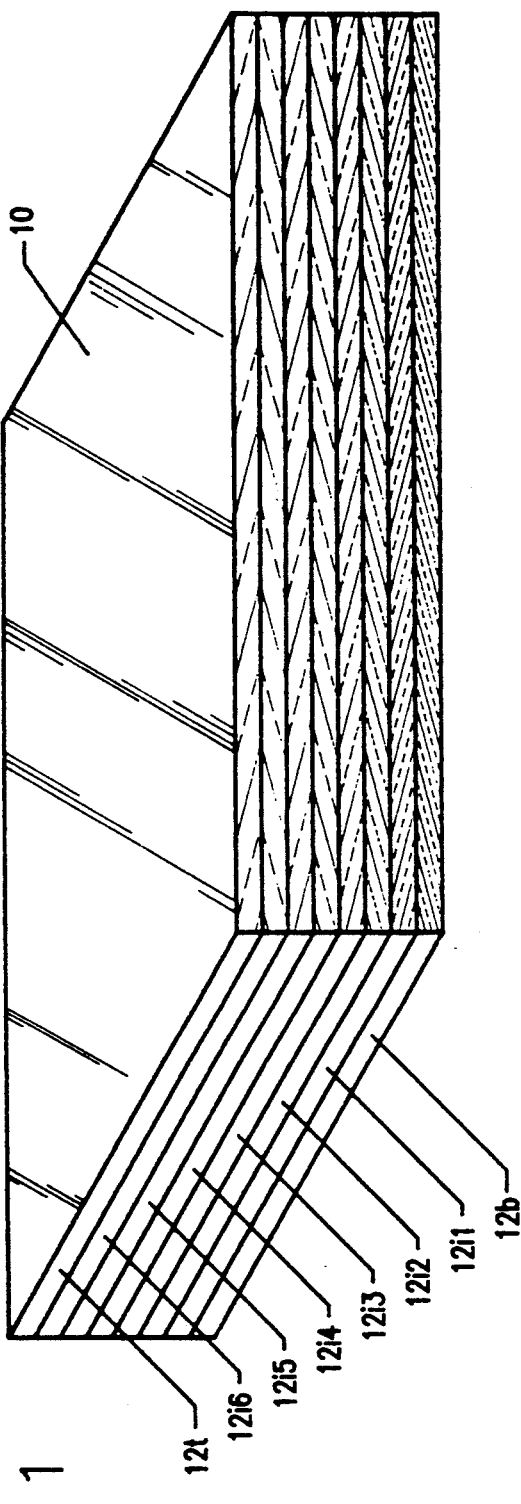
FIG. 1 is a perspective view of a plurality of glass plates, having a rectilinear shape, stacked prior to fusion.
Figure 3:
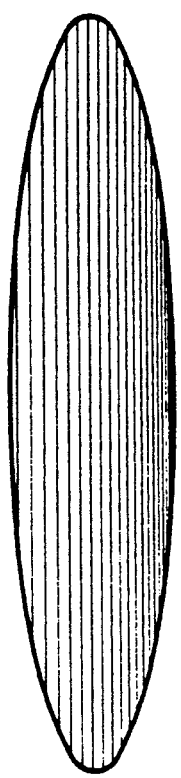
FIG. 3 is a view similar to that of FIG. 2, after forming a lens blank.
Figure 2:
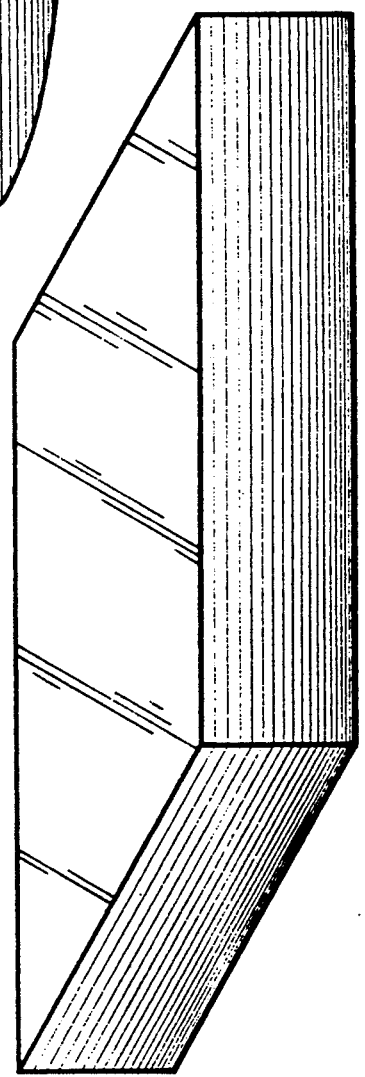
FIG. 2 is a cross-sectional view taken along the line 2—2 of FIG. 1 after fusion.

In the practice of the invention, frits (powders) or plates of the requisite composition are stacked in a suitable crucible, mold, or form in a predetermined fashion. In general, two (or more) "end" compositions are selected and a plurality of compositions intermediate therebetween are prepared. One end composition, in the form of frit or plate, is placed on the bottom of the crucible, mold, or form, the intermediate layers are sequentially placed in a desired order, and the other end composition is placed on top of the stack. The stack is then fused at an appropriate temperature, and the fused mass is cooled in a manner as to avoid stresses.

As used herein, the term "fuse" or "fusing" or "fusion" means the melting together of two or more discrete components, such that a molecular intermingling occurs at the interface between these components to such a degree that there are no longer two discrete components meeting at an interface that has been melted together, but rather a gradual transition in chemical composition from one external surface to the opposite external surface, with no discernable interfaces.

This is to be contrasted with the use in the prior art to mean the gluing or cementing discrete units together by melting or chemically bonding the units at the interface where the surfaces meet. In this latter case, interfaces invariably still exist.

Due to the varying change in composition, the index of refraction follows a similar profile. As a result, it becomes possible to tailor-make the profile to fit any desired shape, such as linear, quadratic, sinusoidal, other trigonometric functions, combinations thereof, and the like. Such profiles may be broadly described as being sufficiently smooth.

During the fusing process, diffusion of various constituents occurs. Thus, the stack is maintained at a temperature (typically, the glass fusion temperature) for a period of time sufficient to cause at least partial diffusion of components to at least partially decrease any structural or compositional interfaces. The extent of diffusion depends on the chemical composition of each layer, the thickness of each layer, and the time and temperature of heating. However, other considerations may apply.

For example, in some lead silicate glasses, diffusion occurs rapidly across compositional interfaces at 1,500° C. in ten minutes. However, such conditions cannot be used where platinum-gold crucibles are employed, due to discoloration of the glass at temperatures above about 1,300° C., which adversely affects optical quality. On the other hand, for lead silicate plates 0.125 inch thick, about 30 hours is needed for diffusion to occur to a depth of one-half of a plate (i.e., complete diffusion) at about 1250° C. This time can be reduced using thinner plates, but this could also reduce the overall lens thickness, unless more plates are provided.

As used herein, the composition of the two end members may vary by as much as employing two different base glasses, for example, a lead silicate glass and a borosilicate glass. Also included in the definition of different compositions, however, is the use of two compositions which have the same components, but in different percentages. In either case, the overriding consideration is providing a fused glass block useful as a lens, for example, having a substantial, controlled change in index of refraction from one surface of the block to the opposite. As used herein, a substantial change in index of refraction is one having a $\Delta n$ of at least about 0.08.

As an example of the fabrication of unidirectional graded refractive index (GRIN) glasses of the invention, two end member glassy compositions are selected, and a plurality of intermediate compositions, say, eight, are prepared. The compositions may be selected to give a linear change in composition from one end member composition to the other, and thus the stack would have the following configuration: layer 1: 100% composition 1 and 0% composition 2; layer 2: 87.5% composition 1 and 12.5% composition 2; layer 3: 75% composition 1 and 25% composition 2, etc. to layer 9, 12.5% composition 1 and 87.5% composition 2; and layer 10, 0% composition 1 and 100% composition 2. Of course, as will be shown below, the stack may comprise a greater or fewer number of layers, the change in composition may be non-linear in order to achieve a nonlinear change in refractive index (which is directly proportional to a change in composition), and one or more additional "end" member compositions may be used to form even more complex refractive index profiles, by inserting, for example, a third end member composition in the middle of the stack, with the intermediate compositions ranging from the first end (bottom) composition to the middle and from the middle composition to the second end (top) composition. Other, even more complex profiles in refractive index gradients may be achieved in similar fashion.

Finally, there are additional considerations which dictate the selection of end members. These involve not only the desired change in index of refraction ($\Delta n$), but also the difference in thermal coefficient of expansion of the two end members, the difference in glass fusion temperature, and the change in density.

For example, it may be critical to minimize the change in thermal coefficient of expansion for a lens that would be exposed to high temperature during use, yet experiences ambient temperatures during non-use. Or, it may be important that the glass fusion temperatures of the two end compositions be similar in order to avoid uncontrolled mixing and diffusion of components during the melting phase of the processing. Or, it may be important that the densities of the two end members be similar so that the order of placing the two members is immaterial (it being recognized by those skilled in the art that a higher density glass in a gravity environment will tend to settle to the bottom of the crucible, mold, or form, thereby causing compositional mixing problems and altering the composition between layers in an undetermined fashion). Finally, it may be important to select end member compositions such that the Abbé values are substantially the same, in order to provide a fused block with minimal dispersion, necessary for certain imaging applications. The teachings of this invention contemplate the choice of end members based not only on one of the foregoing criteria, but also on two or more of these criteria, and on extending these teachings to other criteria known to those skilled in the art to fabricate optical glasses having properties tailored to specific applications.

As used herein, end member compositions having (1) a similar thermal coefficient of expansion have a difference of less than about $0.7 \times 10^{-6}$ cm/cm/°C.; (2) a similar glass fusion temperature have a difference of less than about 50° C.; (3) a similar density have a difference of less than about 0.1 g/cm$^3$; and (4) a similar Abbé number have a difference of less than about 10. With regard to the Abbé value, it will be appreciated by those skilled in the art that the actual difference is extremely dependent on the final use of the material.

Referring now to the drawings wherein like numerals refer to like elements throughout, a stack 10 of plates 12 is shown in FIG. 1, prior to fusion. In the practice of the invention, a plurality of plates is employed. While the number of plates is not critical to the process, it appears that at least five plates must be employed in order to realize the benefits of the invention. Fewer plates may not provide the large changes in index of refraction in a controllable fashion. It will be appreciated that in this discussion, frits may alternatively be employed, having a particle size range and distribution common in the processing of glasses.

While in theory as many plates as desired may be used, considerations such as furnace dimensions, subsequent processing capabilities such as secondary drawing and rolling, required time and temperature conditions for fusion of adjacent plates, final fused block dimension, desired change in index of refraction ($\Delta n$), and initial plate thickness all are factors in dictating the most economical number of plates to use. In general, best results to date have been achieved with from five to eleven plates.

The thickness of the individual plates 12 may be tailored as desired to accomplish a particular finished fused block 10. For example, individual plates, each 3 mm thick, may be used to form a block 24 mm thick.

Practical plate thicknesses of at least about 1 mm are useful for ease of fabrication. However, the invention is not limited to such a minimum thickness; proper processing and handling techniques may permit utilization of thinner plates.

Plate thickness is selected at least in part based on diffusion rates of the particular compositions being used in adjacent plates. The preferred plate thickness ranges from about 1.8 to 3 mm. Further, the thickness of plates in the stack may be varied, depending on location in the stack, in order to refine optical quality and provide the optimum gradient in index of refraction for a given application.

The size of the finished fused block depends on the desired end thickness and on fabrication techniques, but in theory could be several centimeters thick, limited only by the ability to produce such a thick block in a stressfree or permissible stress condition.

The desired range of index of refraction is selected, and the two end members, each having a particular index of refraction, are selected to give the desired refractive index change. The end members are denoted in FIG. 1 as 12$b$ (for bottom) and 12$t$ (for top). Alternatively, one may start from an intermediate composition and develop suitable end member compositions.

Intermediate (i) plate members 12$i$1, 12$i$2, etc., may be prepared by mixing powders of the end members in desired proportions to obtain a desired index change between adjacent plates. For example, where the desired $\Delta n$ is 0.46, the gradient is to be linear and the total number of vertically stacked plates is eight, then the index of refraction of each plate varies by about 0.066 from its neighboring plate. Again, for example, in an eight plate block, 12$i$1 comprises 12.5% of the composition of plate 12$b$ and 87.5% of the composition of plate 12$t$. The composition of other intermediate plate members are accordingly determined.

Plates may be fabricated from frits or cullet, ranging in size from about 325 mesh (<44 $\mu$m) to 5.0 mm. The frits or cullet are then mixed in a rotary tumbler to insure uniform dispersion of one glass composition in the other. The glass composition for the intermediate plates can be made from the batch raw materials formula as well as mixing the glass of two end members. The former approach provides the highest optical quality, and thus is preferred.

The frit or cullet of the desired composition is placed in a mold or crucible and heated to an elevated temperature. This elevated temperature depends on several factors, including the relative chemical differences between the two glasses, the crucible, mold, or form materials (for example, platinum-gold discolors lead-silicate glasses), the presence of elements with a high vapor pressure (such as lead) which can cause injury to personnel or equipment, the possible formation of phase-separated glasses, and whether stirring is required.

In general, heating is done to some temperature above the melting temperature of the component glass having the highest melting temperature, consistent with the foregoing factors. The temperature is maintained at that point until the plate is free of bubbles, typically from about 2 to 6 hrs. Plates are then annealed to reduce the possibility of breakage during subsequent processing. The heating may done under atmospheric conditions. Alternatively, the heating may be done in vacuum to aid in the removal of bubbles.

Finally, other methods of making plates include placing glass batch and/or cullet portions of the base glasses in a high purity crucible of platinum, alumina, or silica, and allowing blending to occur by normal convective currents or by stirring. When the mixture is free of compositional inhomogeneities and bubbles, the molten glass is poured onto a heated plate or into a mold of brass or iron. The resulting glass may be in the shape of a block or slab which can then be sawed to the appropriate plate dimensions. Again, the plate or block is annealed to prevent breakage prior to fusion. Such techniques are well-known in the glass industry.

Several other well-known glass-making techniques for fabricating large quantities of plate glass may also be employed, such as the float process, vertical drawing, and the overflow method. Such well-known methods do not form a part of this invention, although such plates of the required thickness, composition, and index of refraction and other properties can be used.

The plates 12 are stacked in the desired configuration. Owing to the effects of gravity, the densest glass is usually placed on the bottom, with decreasing density toward the top of the stack 10. On the other hand, by matching densities of glasses, complex profiles of refractive index may be created. Or, the use of low gravity environments would also permit formation of profiles independent of density considerations.

The plates 12 may be stacked in a mold (not shown) which enables the stack 10 to retain its shape during fusion. However, the mold may be eliminated so long as some means of restriction is present during fusion to prevent collapse of the stack/block. Mold compositions include those substantially inert with respect to the glass; examples include Pt and 95% Pt-5% Au, as well as the typical ceramics, such as alumina.

While there may be a range of softening temperatures in the stack, depending on individual plate composition, it is preferred to select end member glasses of about the same softening temperature. Use of compositions with similar softening temperatures renders fusion and annealing easier. For example, when the glass plates have the same viscosity at a given temperature, this ensures better control over the fusion and annealing of the species.

It will be appreciated that various shapes other than rectilinear, depicted in FIG. 1, may be employed. For example, disk-shaped glasses may be fabricated, following the same considerations given above. Further, plates of similar density may be fused laterally, as well as vertically. The plates at each level generally have the same composition, although the invention is not limited to such a configuration, other than the refractive index having a gradient along one direction. Finally the process of the invention is not limited to batch processing. Processes in which "ribbons" of glass (of preselected width and thickness and indefinite length) are brought together in a stacked arrangement and fed continuously through one or more furnaces having zones for fusing and, possibly, for annealing the glass at preselected temperatures for preselected periods of time are also contemplated.

The desired stack 10 is placed in a furnace and heated for a period of time. There are several considerations that dictate the particular time-temperature profile employed. For example, some glasses may be placed in the furnace at room temperature and brought to the fusion temperature over a period of hours. Glasses prone to devitrification, however, may have to reach the fusion temperature in a few minutes. This ensures that crystal nucleation and growth are prevented, but may require using a furnace that has been preheated to a predetermined temperature which may be as high as the fusion temperature.

If the individual plates 12 have been previously annealed and their expansion coefficients are not excessively high (greater than about $11 \times 10^{-6}$ cm/cm/°C.), the stack 10 can be placed directly into the furnace at the fusion temperature with no adverse effects. If the plates have not been annealed, however, they may fracture, causing air to enter the stack, which will necessitate a longer fusion time and which may disrupt the gradient profile.

A vacuum-assisted pre-heat step may be used to remove air trapped between layers and to reduce the thermal shock at the fusion temperature. Pre-heat temperatures need to be above the highest softening temperature by approximately 100° C. and vacuum levels between 20 and 30 inches of mercury. If the plate surfaces are very smooth, however, the use of vacuum may only have a minimal effect.

If there are bubbles within a particular plate or plates 12, the fused block 10 may be assembled by sequentially melting one layer at a time, starting with the bottom layer. This method allows bubbles to rise to the surface without passing through a layer of different index, thereby maintaining control of the index location more precisely.

The time of fusion is dependent upon several factors, including the chemical differences between any two adjacent plates, the thickness of the plates, the temperature constraints of the glasses for either phase separation or devitrification, and the mold material. Fusion times between about 1.5 and 40 hours seem sufficient.

The fusion temperature must be sufficiently high so that the viscosity of each of the constituent plates 12 in the stack 10 is sufficiently low. In general, the preferred fusion temperature is approximately twice the maximum softening temperature. During the fusion process, a stable diffusion of constituents takes place over a limited distance so that the resultant index is a smooth function of position.

Following fusion, the fused block 10 must be brought down to room temperature without cracking. This is accomplished by an annealing sequence. Many routes may be taken, and the person skilled in the art can, based on the teachings herein together with knowledge of glass annealing in general, develop an optimum route for a particular combination of glass compositions. In general, the maximum temperature in the annealing process must be below the maximum softening temperature among the constituent plate compositions, and must also take into account the mold or processing materials, the basic constituents of the glass, and their interactions. For optical glasses, these considerations are important, in order to avoid discoloration due to reaction of a glass component with the mold, for example. The annealing process typically takes from about 8 to 60 hours.

The fused block 10 may then be shaped and polished, using well-known techniques. The finished block may be shaped as a lens, for example, or other light directing device. It will be appreciated that lenses of large geometry, with the index of refraction varying along the entire optic axis, may be fabricated in accordance with the teachings of this invention.

The fused block 10 will ordinarily have no discernable boundaries, whether compositional or in terms of physical properties, such as index of refraction. Rather, there will be observed a smoothly varying change in such properties from one side of the glass block to the opposite.

The change in index of refraction may be made quite substantial; a $\Delta n$ of at least about 0.08 is routinely achieved with the teachings of the invention, without resorting to the problems associated with molten salt processes or without requiring the extensive processing times associated with vapor phase diffusion processes. Changes in the index of refraction approaching 0.5, unavailable with the prior art techniques, particularly for the large geometries obtainable herein, are also achievable with the process of the invention. Presently, optical glasses with $\Delta n$ ranging from about 0.08 to 0.2 are readily and routinely prepared.

The process of the invention is not limited to particular types of glasses. So long as the two end members do not form two phases during heating, many pairs of end member glasses may be employed. For example, lead borate glasses may be combined with sodium borate glasses, potassium-barium lead glasses may be combined with potassium-borosilicate glasses, and aluminoborosilicate glasses may be combined with potassium-sodium-lead glasses. The last two pairs of glass types have representative compositions which produce optical quality glass.

INDUSTRIAL APPLICABILITY

Fused glass plates prepared in accordance with the invention are expected to find use as lenses and other related applications where large $\Delta n$ of about 0.08 and greater are required and where large thicknesses, for example, at least about 0.5 inch, along the optic axis are desired.

EXAMPLES

Example 1:

In this example, the index of refraction was chosen so as to vary in a predominantly quadratic fashion along the optic axis.

Sixteen glass plates, each measuring 102 mm×38 mm×3 mm, were arranged in a Pt-Au mold to form a stack having dimensions 204 mm×38 mm×24 mm. The bottom layer comprised a commercially available, lead borate glass (Specialty Glass, Inc., Oldsmar, FL; SP457), which was found by analysis to comprise 82.5 wt% PbO, 11.5 wt% $B_2O_3$, 3.0 wt% $Al_2O_3$, 1.0 wt% CaO; $SiO_2$, $Na_2O$, $K_2O<1$ wt%. and had a refractive index of 1.97. This glass had a density of 6.2 g/cm$^3$, thermal coefficient of expansion of $104 \times 10^{-7}$ cm/cm/°C., and softening temperature of 370° C.

The top layer comprised a commercially available sodium borosilicate glass (Specialty Glass, Inc.; SP712), which was found by analysis to comprise 46.0 wt% $SiO_2$, 16.0 wt% $B_2O_3$, 14.0 wt% $Na_2O$, 14.0 wt% $Al_2O_3$, 5.0 wt% $K_2O$; PbO, CaO $<1$ wt% and had a refractive index of 1.51. This glass had a density of 2.4 g/cm$^3$, a thermal coefficient of expansion of $97 \times 10^{-7}$ cm/cm/°C., and a softening temperature of 628° C.

The average change in the index of refraction of each layer was approximately 0.066. The precise values of the set of indices of the plates were chosen so that the final resultant profile achieved the desired quadratic gradient profile.

The intermediate layers were prepared by casting plates of an appropriately chosen mixture of powders of the above glass compositions. The mixtures were chosen so that the resultant compositions had the required intermediate refractive indices.

The stack was heated to and kept at 1000° C. for 6 hrs to fuse the constituent plates together. Following fusion, the resulting block was annealed by ramping down to below the softening temperature of the low index glass (here, to 500° C.) over a period of time of about 15 hrs, holding at that temperature for 3 hrs, then ramping down to the annealing temperature of the high index glass (here, to 335° C.) over a period of time of about 25 hrs, holding at that temperature for about 2 hrs, then ramping down to 275° C (the lowest strain point of the constituent glasses) over a period of time of about 2 hrs, and finally ramping down to room temperature by shutting off the furnace (about 10 to 12 hrs).

Figure 4:
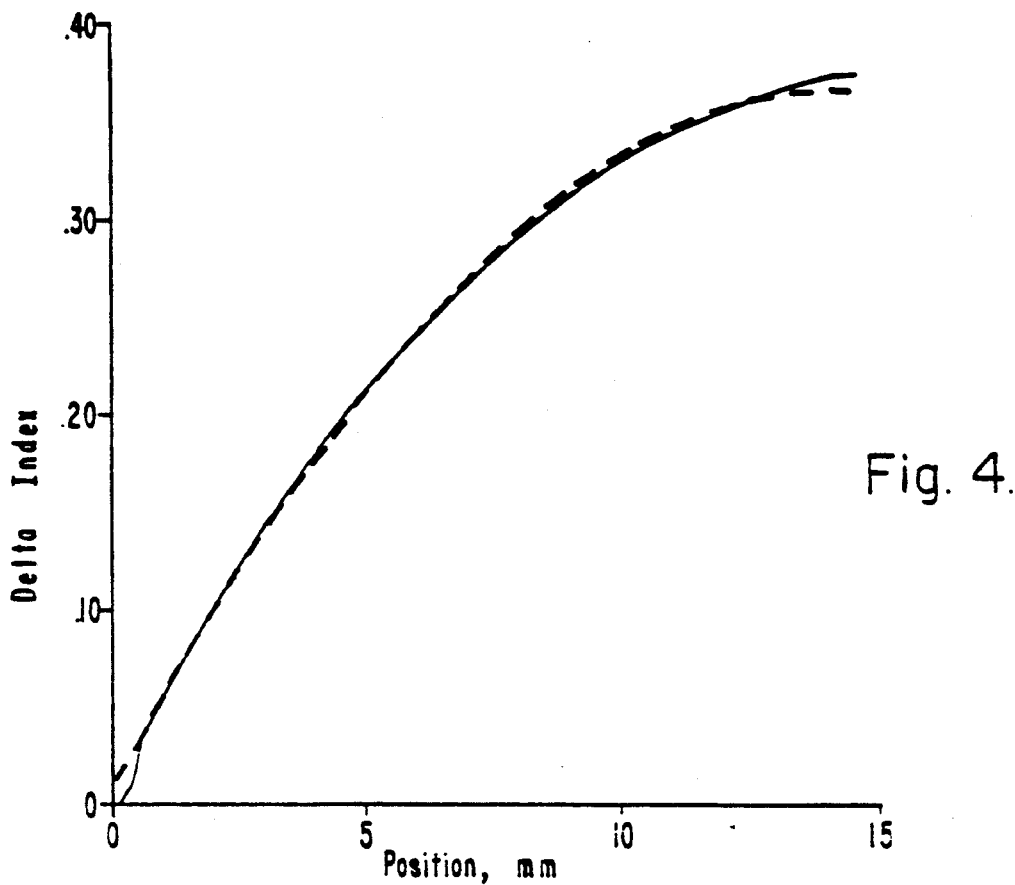
FIG. 4, on coordinates of $\Delta n$ and position, is a plot of actual change in index of refraction with distance through a fused glass stack and calculated according to a polynomial equation.

After polishing, the block evidenced an axially graded index of refraction, in which the index of refraction changed along the optic axis, from bottom to top. In order to measure the index of refraction profile, a vertical slice was taken of the cross-section and optically polished. Conventional interferometric techniques were used to measure the index of refraction as a function of vertical position. The results showed a smoothly changing index of refraction which could be fit by a simple polynomial which is directly suitable for use in well-known lens design computer programs. The desired predominantly quadratic profile was found to fit the following equation:

$$\Delta n = 0.00731711 + 0.0484803x - 0.00162745x^2$$

where x is the distance from the top of the sample, at a wavelength of 0.6328 μm. The plotted curve is shown in FIG. 4, where the solid line represents the actual measured data, while the dashed line represents the calculated values from the above equation.

Example 2

In this example, the index of refraction was chosen so as to vary in a predominantly linear fashion along the optic axis.

Four glass plates, each measuring 51 mm×51 mm×2 mm and one glass plate measuring 51 mm×51 mm×6 mm were arranged in a Pt-Au mold to form a stack having dimensions 51 mm×51 mm×14 mm. Each plate was cast from appropriate powder mixtures of the two basic constituents used in Example 1. The index range was from 1.66 to 1.56 and the corresponding density range was from 3.64 to 2.83 g/cm$^3$. The difference in refractive index between adjacent layers was a constant 0.025, leading to the desired linear gradient profile.

The stack was heated to and kept at 1040° C. for 8 hrs to fuse the constituent plates together. Following fusion, the resulting block was annealed by ramping down to 600° C. in 8 hrs and held there for 4 hrs. A 2 hr ramp down to 500° C. with a 3 hr hold, a 10 hr ramp to 450° C. with a 3 hr hold, and finally shutting off the furnace and cooling to room temperature in about 11 hrs completed the annealing process.

After polishing and trimming, the block evidenced an axially graded index of refraction. The index profile was measured as in Example 1. The results again showed a smoothly varying index of refraction, with $\Delta n = 0.0869$.

Figure 5:
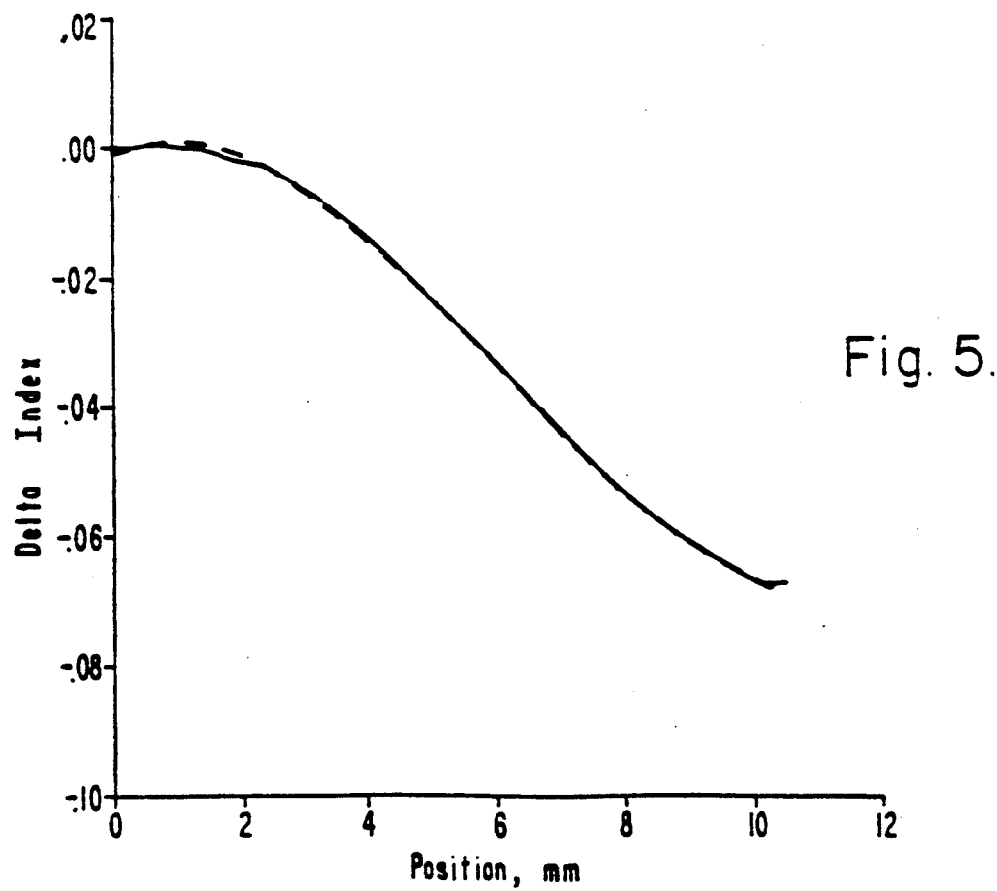
FIG. 5, on coordinates of $\Delta n$ and position, is a plot of actual change in index of refraction with distance through another fused glass stack and calculated according to a polynomial equation.

The desired predominantly linear profile was found to fit the following equation:

$$\Delta n = -0.0011071 + 0.002424942x - 0.00238295x^2 + 0.000130375x^3$$

where x is the distance from the bottom of the sample, at a wavelength of 0.6328 μm. The plotted curve is shown in FIG. 5, where the solid line represents the actual measured data, while the dashed line represents the calculated values from the above equation.

Example 3

In this example, the index of refraction was chosen to produce a linear gradient. Five layers, each 25 mm×25 mm ×3 mm, were arranged in a Pt-Au mold to form a stack measuring 25 mm×25 mm×15 mm.

The bottom layer comprised a potash barium lead glass, available under the trade designation BaF4 from Schott Glass Technologies, Inc. (Duryea, Pa.). According to a Schott Material Safety Data Sheet, such glasses have a composition given by 21–50% silica, 21–50% lead oxide, 11–20% barium oxide, 1–10% potassium oxide, 1–10% zinc oxide, <1% sodium oxide, <1% arsenic trioxide. This glass had a refractive index of 1.6056, a coefficient of expansion of $88 \times 10^{-7}$ cm/cm/°C., a density of 3.5 g/cm$^3$, and a softening temperature of 694° C.

The top layer comprised a potash borosilicate, available under the trade designation K7 from Schott Glass Technologies, Inc. (Duryea, Pa.). According to a Schott Material Safety Data Sheet, such glasses have a composition given by <51% silica, 11–20% potassium oxide, 1–10% boron oxide, 1–10% sodium oxide, 1–10% zinc oxide, <1% lead oxide, titanium oxide, and arsenic trioxide. This glass had a refractive index of 1.5111, a coefficient of expansion of $97 \times 10^{-7}$ cm/cm/°C., a density of 2.54 g/cm$^3$, and a softening temperature of 712° C.

The index of refraction of each layer changed by about 0.027, leading to the desired linear gradient profile. Intermediate plates were cast from appropriately chosen mixtures of powders. The powders were prepared from solid blocks of the two base glasses.

The plates were prepared by heating at 1400° C. for 2 hrs, then rapidly cooling to 500° C., where they were held for 6 hrs in order to completely anneal. The plate mixtures were chosen so that the resulting homogeneous mixture had the required intermediate refractive index.

The stack was assembled by sequentially melting each layer, beginning with the bottom layer. The stack was preheated at 960° C. for ½ hr, and then placed into the fusing furnace at 1400° C. for 8 hrs. The resulting fused block was taken from the fusing furnace and allowed to cool to room temperature in about 25 min. The block was then heated to 500° C. in 2 hrs and then maintained at that temperature for 6 hrs in order to anneal. The block was then cooled to 300° C. over 2 hrs and then allowed to cool to room temperature over about 6 hrs.

After polishing, the resulting block evidenced an axially graded index of refraction, in which the index of refraction changed along the optic axis from top to bottom. The index of refraction appeared to change smoothly as a function of position and in such a way as to evidence a predominantly linear profile.

Additional Examples

Glasses may be made by judiciously combining two (or more) end members having certain preselected properties. Table I below lists several compositions commercially available from Schott Glass. The major oxide components are listed in descending order of concentration.

TABLE I

Schott Glass Designations and Components

| Glass/ | Major Oxide Components |
|---|---|
| BaF3 | $SiO_2$, BaO, PbO, $Na_2O$, $K_2O$, ZnO, $As_2O_3$ |
| BaF4 | $SiO_2$, BaO, PbO, $Na_2O$, $K_2O$, ZnO, $As_2O_3$ |
| BaF50 | $SiO_2$, $B_2O_3$, BaO, PbO, $Na_2O$, $Al_2O_3$, $TiO_2$, $La_2O_3$, $Zr_2O_3$, $As_2O_3$, $Li_2O$ |
| BaK5 | $SiO_2$, BaO, $B_2O_3$, $Na_2O$, $K_2O$, ZnO, $Al_2O_3$, $As_2O_3$ |
| BK7 | $SiO_2$, $B_2O_3$, BaO, $Na_2O$, $K_2O$, ZnO, CaO, $TiO_2$, $As_2O_3$ |
| FK3 | $SiO_2$, $B_2O_3$, $Na_2O$, $K_2O$, $Al_2O_3$, $As_2O_3$ |
| K7 | $SiO_2$, BaO, PbO, $Na_2O$, $K_2O$, ZnO, $As_2O_3$ |
| K10 | $SiO_2$, PbO, $Na_2O$, $K_2O$, $Al_2O_3$, $As_2O_3$, $Sb_2O_3$ |
| K50 | $SiO_2$, ZnO, $B_2O_3$, $Na_2O$, $K_2O$, $TiO_2$, $Sb_2O_3$ |
| KF50 | $SiO_2$, PbO, $Na_2O$, $K_2O$, ZnO, $As_2O_3$, $Sb_2O_3$ |
| LaK8 | $B_2O_3$, $La_2O_3$, $SiO_2$, ZnO, $Zr_2O_3$, $As_2O_3$ |
| LaK9 | MgO, $SiO_2$, $B_2O_3$, BaO, ZnO, CaO, $Ti_2O_3$, $La_2O_3$, $AS_2O_3$, $Y_2O_3$ |
| LaK11 | SrO, $SiO_2$, $B_2O_3$, BaO, $Al_2O_3$, $La_2O_3$, $Zr_2O_3$, $As_2O_3$ |
| LaK21 | $SiO_2$, $B_2O_3$, BaO, $La_2O_3$, $Zr_2O_3$, $WO_3$, $As_2O_3$ |
| LaKL21 | $SiO_2$, $B_2O_3$, CaO, $La_2O_3$, $Zr_2O_3$, $As_2O_3$ |
| LaKN7 | $SiO_2$, $B_2O_3$, BaO, $Al_2O_3$, $Zr_2O_3$, $WO_3$, $As_2O_3$ |
| LaKN14 | $SiO_2$, $B_2O_3$, CaO, $La_2O_3$, $Zr_2O_3$, $Sb_2O_3$ |
| LF4 | $SiO_2$, $B_2O_3$, PbO, $Na_2O$, $K_2O$, $As_2O_3$ |
| LF7 | $SiO_2$, PbO, $Na_2O$, $K_2O$, $As_2O_3$ |
| LLF1 | $SiO_2$, PbO, $Na_2O$, $K_2O$, ZnO, $Al_2O_3$, $As_2O_3$, $Sb_2O_3$ |
| LLF2 | $SiO_2$, PbO, $Na_2O$, $K_2O$, $As_2O_3$ |
| PSK3 | $SiO_2$, $B_2O_3$, BaO, $Na_2O$, $K_2O$, $Al_2O_3$, $As_2O_3$ |
| SF2 | $SiO_2$, PbO, $Na_2O$, $K_2O$, $As_2O_3$ |
| SF6 | $SiO_2$, PbO, $Na_2O$, $K_2O$, $As_2O_3$ |
| SFL6 | $SiO_2$, BaO, PbO, $Na_2O$, CaO, $TiO_2$, $As_2O_3$, $Nb_2O_5$ |
| SK1 | $SiO_2$, $B_2O_3$, BaO, PbO, ZnO, $Al_2O_3$, $Sb_2O_3$ |
| SK4 | $SiO_2$, $B_2O_3$, BaO, PbO, $Al_2O_3$, $Sb_2O_3$ |
| SK6 | $SiO_2$, BaO, $B_2O_3$, ZnO, $Al_2O_3$, $Sb_2O_3$ |
| SK14 | $SiO_2$, $B_2O_3$, BaO, $Al_2O_3$, $Sb_2O_3$ |
| SK15 | $SiO_2$, $B_2O_3$, BaO, PbO, ZnO, $Al_2O_3$, $La_2O_3$, $Zr_2O_3$, $As_2O_3$ |
| SK16 | $SiO_2$, $B_2O_3$, BaO, ZnO, CaO, $Al_2O_3$, $TiO_2$, $La_2O_3$, $Zr_2O_3$, $WO_3$, $As_2O_3$, $Sb_2O_3$ |
| SSK1 | $SiO_2$, BaO, $B_2O_3$, PbO, ZnO, $Al_2O_3$, $Na_2O$, $As_2O_3$ |
| SSK3 | $SiO_2$, BaO, $B_2O_3$, PbO, $K_2O$, ZnO, $Al_2O_3$, $Sb_2O_3$ |

Table II below lists the values of refractive index (n), Abbé number, thermal coefficient of expansion (TC, in $10^{-6}$ cm/cm/°C., glass softening temperature, density, and transmissivity for the glasses listed in Table I. The refractive index is taken at 587.6 nm (sodium D). The transmissivity is taken at 400 nm, through 25 mm sample thickness.

TABLE II

Physical Properties of Schott Glasses.

| Glass | Refractive Index, n | Abbé Number | TC | Temp., °C.* | Density, g/cm$^3$ | Transmissivity |
|---|---|---|---|---|---|---|
| BaF3 | 1.583 | 46.47 | 7.8 | 720 | 3.28 | 0.98 |
| BaF4 | 1.606 | 43.93 | 7.9 | 694 | 3.5 | 0.97 |
| BaF50 | 1.683 | 44.5 | 8.3 | 682 | 3.8 | 0.83 |
| BaK5 | 1.556 | 58.65 | 7.8 | 737 | 3.02 | 0.985 |
| BK7 | 1.517 | 64.17 | 7.1 | 719 | 2.51 | 0.99 |
| FK3 | 1.464 | 65.77 | 8.2 | 622 | 2.27 | 0.96 |
| K7 | 1.511 | 60.41 | 8.4 | 712 | 2.53 | 0.98 |
| K10 | 1.501 | 56.41 | 6.5 | 691 | 2.52 | 0.984 |
| K50 | 1.522 | 60.18 | 7.9 | 733 | 2.62 | 0.988 |
| KF50 | 1.530 | 51.12 | 7.3 | 665 | 2.70 | 0.980 |
| LaK8 | 1.713 | 53.83 | 5.6 | 720 | 3.78 | 0.950 |
| LaK9 | 1.691 | 54.71 | 6.3 | 722 | 3.51 | 0.95 |
| LaK11 | 1.658 | 57.26 | 7.2 | 695 | 3.79 | 0.92 |
| LaKL21 | 1.640 | 59.75 | 6.1 | 705** | 2.97 | 0.96 |
| LaK21 | 1.640 | 60.10 | 6.8 | 716 | 3.74 | 0.965 |

TABLE II-continued

Physical Properties of Schott Glasses.

| Glass | Refractive Index, n | Abbé Number | TC | Temp., °C.* | Density, g/cm³ | Transmissivity |
|---|---|---|---|---|---|---|
| LaKN7 | 1.652 | 58.52 | 7.1 | 716 | 3.84 | 0.96 |
| LaKN14 | 1.697 | 55.41 | 5.5 | 734 | 3.63 | 0.955 |
| LF4 | 1.578 | 41.6 | 8.1 | 620 | 3.21 | 0.99 |
| LF7 | 1.575 | 41.49 | 7.9 | 614** | 3.2 | 0.99 |
| LLF1 | 1.548 | 45.75 | 8.1 | 628 | 2.94 | 0.99 |
| LLF2 | 1.541 | 47.17 | 7.9 | 629 | 2.87 | 0.99 |
| PSK3 | 1.552 | 63.46 | 6.2 | 736 | 2.91 | 0.99 |
| SF2 | 1.648 | 33.85 | 8.4 | 600 | 3.86 | 0.97 |
| SF6 | 1.805 | 25.43 | 8.1 | 538 | 5.18 | 0.73 |
| SFL6 | 1.805 | 25.39 | 9.0 | 685** | 3.37 | 0.67 |
| SK1 | 1.610 | 56.71 | 6.1 | 786 | 3.56 | 0.97 |
| SK4 | 1.613 | 58.63 | 6.4 | 767 | 3.57 | 0.97 |
| SK6 | 1.613 | 56.40 | 6.2 | 788 | 3.6 | 0.972 |
| SK14 | 1.603 | 60.60 | 6.0 | 773 | 3.44 | 0.97 |
| SK15 | 1.623 | 58.06 | 6.9 | 744 | 3.64 | 0.96 |
| SK16 | 1.62 | 60.33 | 6.3 | 750 | 3.5 | 0.97 |
| SSK1 | 1.617 | 53.91 | 6.3 | 759 | 3.63 | 0.965 |
| SSK3 | 1.614 | 51.16 | 6.6 | 773 | 3.61 | 0.963 |

Note:
*Temperature at a viscosity of $1 \times 10^{7.6}$ dPas.
**Estimated

Based on the judicious selection of glasses available, some of which are listed in the foregoing two Tables, it is possible to select pairs (or triplets or more) of glasses having certain specific desired properties which are important in processing and in the finished product. For example, it may be desirable to fabricate a glass with a change in index of 0.08 to 0.1 with a significant change in density, but necessary to match the thermal coefficients of expansion and the melting temperature within certain limits. By comparing the characteristics of the available glasses, several potential matches are found. Examples 4-7 below describe the preparation of five such matches (pairs), while Example 8 below describes the preparation of a triad of glasses.

Example 4: SF6 - LF7

In this Example, SF6 and LF7 glasses, available from Schott Glass Technologies, Inc. and having the designations listed in Table I and the properties listed in Table II, were used. Chemical compositions were determined from bulk chemical analysis and found to be the following:

SF6 - 71% PbO, 27% $SiO_2$, 1% $K_2O$, 0.6% $Na_2O$
LF7 - 58% $SiO_2$, 33% PbO, 6% $K_2O$, 3% $Na_2O$.

Three intermediate compositions were prepared by mixing frits of the two base glasses in Pt-Au molds and heating at 1100° C. for 4 hours. The mixtures were stirred about six times during the first 2 hours. The resulting plates were then annealed at 500° C. for about 1½ hours. The compositions were chosen to produce a linear gradient, therefore, there was an index change of about 0.0575 between adjacent layers.

The five layers were assembled in a Pt-Au mold which was 2.5 cm×2.5 cm×2.0 cm deep. The bottom and top layers (SF6 and LF7, respectively) were cut and polished to produce a layer 6 mm thick, and the three intermediate plates were cut and polished to produce 1 mm layers.

To minimize the occurrence of trapped bubbles, the SF6 layer was melted at 1100° C. for a few minutes to provide a bubble-free contact with the bottom of the mold. The four remaining layers were polished to have a rounded bottom and a flat top, which when assembled and heated, tends to squeeze out trapped air as the glasses soften.

The assembled stack of plates was heated at 120°/min to 1100° C. and held there for 4 hours. The fused block was then cooled 470° C. at a rate of 10° C./min and held at 470° C. for 2 hours as the first part of the annealing sequence. The block was then cooled at 2.0°/min to 400° C. and held there for 2 hours. Finally, the block was cooled to room temperature slowly, at the rate of the laboratory furnace (about 5 hours).

The finished block showed a substantially linear gradient of refractive index with no apparent interfaces.

Example 5: K7 - SFL6

In this Example, 7 and SFL6 glasses, available from Schott Glass Technologies, Inc. and having the designations listed in Table I and the properties listed in Table II, were used.

Three intermediate compositions were fabricated to produce a gradual transition of composition which is accompanied by a gradual transition of refractive index. The intermediate plates were made by melting mixtures of K7 and SFL6 frits. The mixtures were heated in Pt-Au molds at 1350° C. for a total of 4 hours. To anneal, the plates were cooled from 1350° C. to 550° C. at a rate of 5.0°/min, and then soaked at 550° C. for 2 hours. They were then cooled to 475° C. at a rate of 2.0°/min. and held at 475° C. for 1 hour. The plates were then cooled to room temperature at the rate of the laboratory furnace, about 5 hours.

The top and bottom layers, K7 and SFL6, respectively, were cut from solid block and ground to 6 mm thickness. The three intermediate composition plates were ground to 1 mm thickness, and then all five plates were cut to the required rectangular dimensions of 37 mm by 25 mm. The plates were assembled in a Pt-Au mold in order of decreasing density, so that gravity induced convection currents would not arise.

The stack of plates was then fused during three separate high temperature periods in order to obtain the desired proof of method. The gradient block was heated at 1350° C. for 3 hours, 1400° C. for 1 hour, and then 1400° C. for an additional 2 hours. After the final high temperature dwell, the gradient block was annealed by cooling from 1400° C. to 560° C. at a rate of 2.0°/min, holding at 560° C. for 4 hours, cooling to 475° C. at 1.0°/min, holding at 475° C. for 4 hours, and then cooling to room temperature in about 5 hours.

Figure 6:
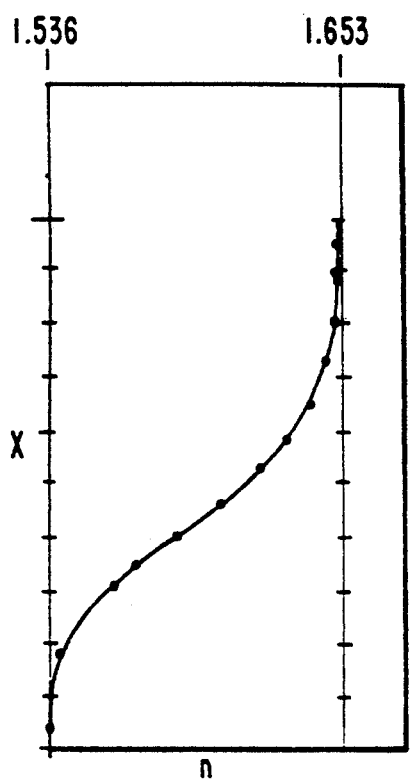
FIGS. 6–9, on coordinates of index of refraction n and position, are additional plots of the actual change in index of refraction with distance through fused glass stacks for various combinations of pairs of glasses.

After preparing an optical measurement specimen from the gradient block, the refractive index profile was calculated. As can be seen in FIG. 6, a largely quadratic relationship of index to position was produced, with a smooth transition from one surface to the other.

It should be noted that cracking of the resultant gradient block was observed, along with some devitrification that occurred during processing.

Example 6: BK7 - LaK11

In this Example, BK7 and LaK11 glasses, available from Schott Glass Technologies, Inc. and having the designations listed in Table I and the properties listed in Table II, were used.

Three intermediate compositions were chosen to provide a gradual transition of properties from those of BK7 to those of LaK11. These intermediate plates were fabricated by mixing together frit of BK7 and LaK11 and heating at 1350° C. for 4 hours without any mechanical stirring. To anneal, the plates were cooled to 540°

C. at 4.0°/min, held there for 1 hour, cooled to 490° C. at 1.5°/min, held there for 1 hour, and finally cooled to room temperature in about 5 hours.

The top and bottom layers, BK7 and LaK11, respectively, were cut from a block and ground to 5.5 mm thick and 6 mm, respectively. The three intermediate composition plates were ground to 1 mm thick, and all five plates were cut to the correct length and width of about 26 mm×2.6 mm. The plates were assembled in a Pt-Au mold with the high index, high density LaK11 on the bottom and subsequent layers added according to decreasing density.

The assembled stack was heated to 1400° C. and held there for 2 hours to fuse. To anneal, the gradient block was cooled from 1400° C. to 560° C. at 2.0°/min, held at 560° C. for 4 hours, cooled to 475° C. at 1.0°/min, held there for 4 hours, and finally cooled to room temperature in about 5 hours.

Figure 7:
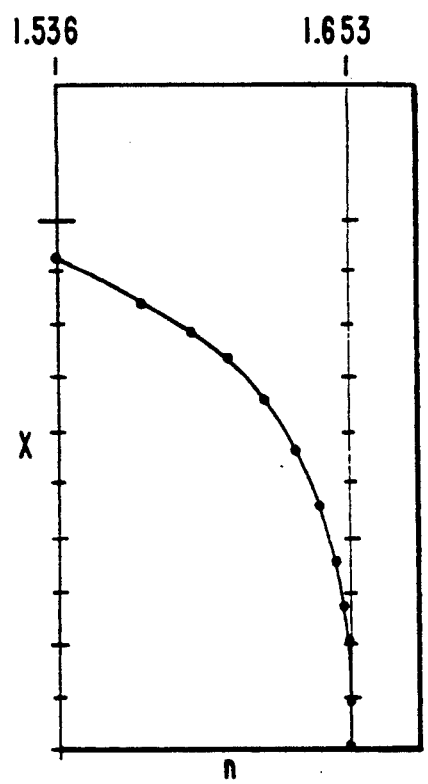

After preparing an optical measurement specimen from the resulting gradient block, the refractive index versus position was determined, and as can be seen in FIG. 7, the relationship is partially quadratic and partially linear, and provides a smooth gradient from one base glass to the other base glass.

It is noted that the gradient block was devitrified to a depth of about 4 mm from the top surface, but the block below showed no disruption of optical properties.

Example 7: BK7 - LaK21

In this Example, BK7 and LaK21 glasses, available from Schott Glass Technologies, Inc. and having the designations listed in Table I and the properties listed in Table II, were used.

Three intermediate compositions were chosen to provide a smooth transition of optical and physical properties from one end glass, BK7, to the other end glass, LaK21. Plates of these intermediate compositions were fabricated from frit mixtures of the two end glasses which were heated in Pt-Au molds. One plate was heated first to 1400° C. for 1 hour and then to 1300° C. for 2 hours; this plate was then annealed by holding at 625° C. for 2 hours. The other two intermediate composition plates were held at 1350° C. for a total of 3 hours, and then annealed by holding at 625° C for 2 hours.

To minimize any trapped bubbles, the high index, high density LaK21 was melted at 1400° C. for just a few minutes, and then left undisturbed in the 25 mm×25 mm Pt-Au mold. The bottom layer of LaK21 was about 3 mm thick. The three intermediate composition plates were cut to the required dimensions of 25 mm×25 mm and then ground to provide a layer thickness of about 1.8 mm. The top, lowest index layer, BK7, was cut from a solid block as supplied from Schott Glass and ground to size.

The graded stack of plates was assembled by co-melting the second and third layers, being the higher density intermediate plates, with the previously melted LaK21. After these three layers were bonded, the fourth layer, being the lowest density intermediate plate, was melted on top. Finally, the BK7 was added to complete the unfused stack. During this assembly stage, the temperatures used were lower than the fusion temperature and the time required was just enough to allow flow of the individual plates.

The assembled stack was fused by heating at 1300° C. for 2 hours and then at 1350° C. for 1 hour. The gradient block was removed from the 1350° C. furnace and allowed to cool rapidly to room temperature. The block was then reheated to 625° C. and held there for 2 hours to anneal. The block was then cooled slowly to room temperature.

Figure 8:
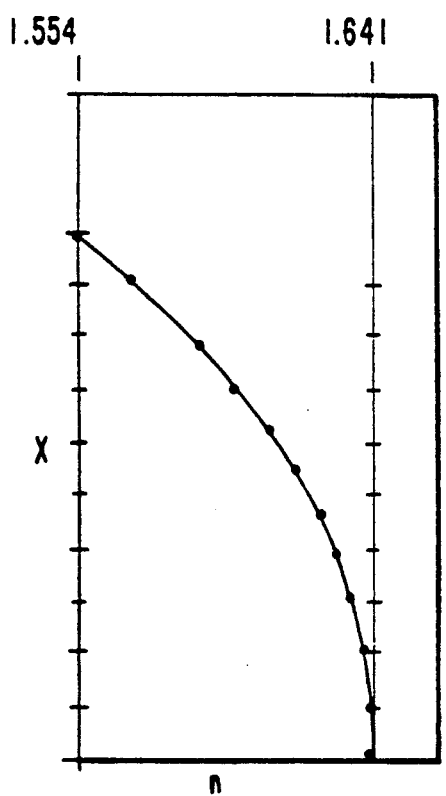

An optical measurement specimen was prepared from the gradient block and the refractive index versus position was calculated. As seen in FIG. 8, the change in refractive index is partially linear and partially quadratic and provides a smooth transition between the two base glasses.

Table III below summarizes the calculated properties for the pairs of glasses employed in Examples 3-7.

TABLE III

| | Actual Pairs of Glasses Having Certain Desired Properties. | | | | | |
|---|---|---|---|---|---|---|
| Example | Pairs | Δn | ΔTC | ΔT | Δv | Δρ |
| 3 | K7-BaF4 | 0.094 | 0.5 | 18 | 16.48 | 0.97 |
| 4 | SF6-LF7 | 0.23 | 0.2 | 76 | 15.76 | 1.98 |
| 5 | K7-SFL6 | 0.294 | 0.6 | 27 | 35.02 | 0.74 |
| 6 | BK7-LaK11 | 0.142 | 0.1 | 24 | 6.91 | 1.28 |
| 7 | BK7-LaK21 | 0.124 | 0.3 | 3 | 4.07 | 1.23 |

Example 8: Three Glasses, Uniaxial Gradient

In this Example, K7, BaF4, and BaF50 glasses, available from Schott Glass Technologies, Inc. and having the designations listed in Table I and the properties listed in Table II, were used.

Example 3 above showed that BaF4 and K7 can be used successfully to produce a block with a gradient refractive index. The index difference for K7 and BaF4 is about 0.094. To cause a larger index change, a composition was determined from mixture of BaF4 and BaF50. A mixture of 22 weight percent BaF50 and 78 weight percent BaF4 gave a refractive index of 1.617, which provided an index change of about 0.106 when combined with 100% K7.

A gradient refractive index block was prepared from powders of these three glasses. Seven different layers were used and calculated to produce a linear gradient of index change. The bottom layer was 22 weight percent BaF50 and 78 weight percent BaF4, the second layer was 100% BaF4, the third through sixth layers comprised different percentages of BaF4 and K7 (shown below), and the seventh, or top layer, was 100% K7.

3rd layer: 84.5 wt% BaF4 15.5% K7
4th layer: 66.9 wt% BaF4 33.1% K7
5th layer: 49.5 wt% BaF4 50.5% K7
6th layer: 26.6 wt% BaF4 73.4% K7.

The powder combinations were mixed in a small rotary tumbler to insure more uniform diffusion of components.

The layers were arranged in a Pt-Au mold and heated to 1400° C. The mold was heated at 1400° C. for 2 hours and then removed from the furnace and cooled to room temperature. To anneal the fused gradient block, it was heated to 500° C. at about 2.6°/min, held at 500° C. for 6 hours, cooled to 300° C. at about 0.4°/min, and then cooled to room temperature slowly.

The resulting gradient index block showed a gradual change in refractive index from one surface to the other, with no disruption to the structural integrity of the block.

Example 9:

A series of eleven lead silicate glasses was developed to provide a linear change in refractive index. Some of the properties of these glasses are listed in Table IV. The compositions were produced in slab form, with a thickness of about 20 mm.

TABLE IV

Lead Silicate Glass Data.

| Layer | n | Abbé No. | ρ, g/cm³ | PbO | SiO₂ | K₂O | Sb₂O₃ |
|---|---|---|---|---|---|---|---|
| 1 | 1.5952 | 37.55 | 3.33 | 39.1 | 50.1 | 9.8 | 1.0 |
| 2 | 1.6060 | 37.48 | 3.47 | 41.8 | 48.9 | 9.3 | 1.0 |
| 3 | 1.6175 | 37.23 | 3.53 | 43.9 | 46.4 | 8.7 | 1.0 |
| 4 | 1.6274 | 38.46 | 3.61 | 46.6 | 44.3 | 8.1 | 1.0 |
| 5 | 1.6323 | 34.93 | 3.62 | 46.7 | 44.2 | 8.0 | 1.0 |
| 6 | 1.6462 | 34.29 | 3.72 | 50.0 | 42.0 | 7.0 | 1.0 |
| 7 | 1.6575 | 33.54 | 3.80 | 51.4 | 40.3 | 7.1 | 1.0 |
| 8 | 1.6670 | 31.75 | 3.92 | 54.5 | 38.3 | 6.0 | 1.0 |
| 9 | 1.6775 | 32.19 | 4.01 | 55.0 | 38.7 | 5.3 | 1.0 |
| 10 | 1.6845 | 31.92 | 3.99 | 55.8 | 37.4 | 5.8 | 1.0 |
| 11 | 1.6944 | 30.65 | 4.16 | 57.7 | 35.6 | 5.6 | 1.0 |

To fabricate a lens blank, plates had to be produced from the slab form. This was done by placing a piece of slab on a low density refractory board, and then heating the glass to about 800° C. At this temperature, the glass flowed outward to produce a plate of about 10 cm×10 cm×6 mm, but did not adhere to the refractory board. The plates were cut to the square dimensions necessary to fit into a Pt-Au mold which was about 7.5 cm×7.5 cm. The plates were then ground and polished to the required thickness. The bottom layer was polished to about 1.8 mm, the top layer to about 6.1 mm, and the nine intermediate plates were polished to about 1.0 mm each. The surface quality of the plates was about 80–50 scratch-dig. The plates were arranged in the mold in order of decreasing density.

The stack of plates was placed in a tube furnace preheated to 720° C., and then vacuumed at about 20 inches of mercury for 20 minutes. The stack was, at that point, bonded together with a minimal amount of bubbles trapped between plates. The stack was then transferred to a second furnace pre-heated to 700° C. and heated to 1150° C. at 60° min. The block was held at 1150° C. for 30 hours, cooled to 490° C. at 2.0°/min, held at 490° C. for 1 hour, cooled to 400° C. at 0.2°/min, held at 400° C. for 4 hours, and finally cooled to room temperature in about 5 hours.

Figure 9:
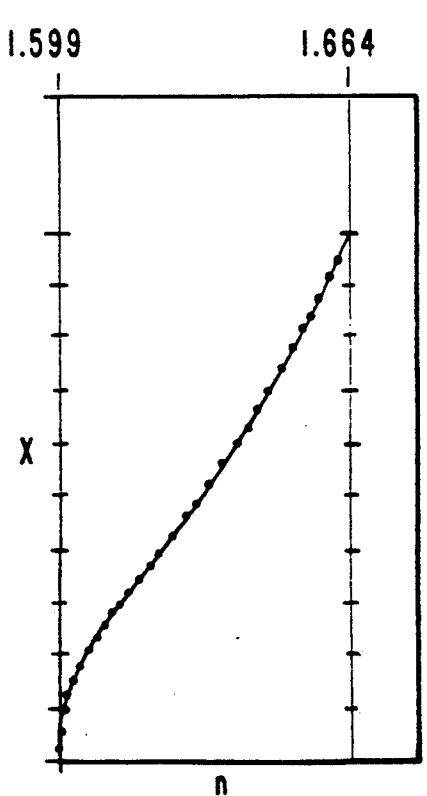

An optical measurement specimen was cut from this material and the refractive index versus position was determined. mined. From FIG. 9, it can be seen that the resulting relationship is largely linear.

Examples 10–28:

These Examples are based on the judicious selection of pairs of glasses from Tables I and II, above, based on the discussion associated with Examples 4–7 regarding considerations involved in selecting pairs of glasses. Potential matches are listed in Table V below.

By comparing the characteristics of all the glasses commercially available, it is possible to generate multiple matches, depending on the desired attributes. It is then necessary to ascertain any chemical differences which may cause undesirable effects, such as phase separation or devitrification, etc. Other factors which may affect the outcome of combining glass formulas are those seen in the furnace or annealing schedules of the various glasses or any reaction by either end member glass to the mold, crucible, or form material being used.

Table V below lists selected pairs of glasses in which the combination possesses one or more of the desired properties, namely, having a change in index of refraction ($\Delta n$) of at least about 0.08 and with the two end member compositions have a similar thermal coefficient in expansion (low $\Delta TC$; less than about $0.7 \times 10^{-6}$ cm/cm/°C.) or a similar glass fusion temperature ($\Delta T$; less than about 50° C.) or a similar Abbé number ($\Delta v$; less than about 10) or a similar density ($\Delta \eta$; less than about 0.1 g/cm³).

TABLE V

Potential Pairs of Glasses Having Certain Desired Properties.

| Example | Pairs | Δn | ΔTC | ΔT | Δv | Δρ |
|---|---|---|---|---|---|---|
| 10 | SK1-LaKN14 | 0.086 | 0.6 | 52 | 1.30 | 0.07 |
| 11 | SK14-LaK9 | 0.088 | 0.3 | 51 | 5.89 | 0.07 |
| 12 | PSK3-LaKL21 | 0.092 | 0.1 | 31 | 3.71 | 0.06 |
| 13 | SF6-LF4 | 0.227 | 0 | 82 | 16.17 | 1.97 |
| 14 | SF6-LLF1 | 0.257 | 0 | 90 | 20.32 | 2.24 |
| 15 | SF6-LLF2 | 0.265 | 0.2 | 91 | 21.74 | 2.31 |
| 16 | LaKN7-BK7 | 0.134 | 0 | 3 | 5.65 | 1.33 |
| 17 | SK4-BK7 | 0.096 | 0.7 | 48 | 5.54 | 1.06 |
| 18 | SK15-BK7 | 0.106 | 0.2 | 25 | 6.11 | 1.14 |
| 19 | SK16-BK7 | 0.104 | 0.8 | 31 | 3.84 | 1.01 |
| 20 | BaF50-BaF3 | 0.100 | 0.5 | 38 | 1.97 | 0.52 |
| 21 | SF2-LLF1 | 0.099 | 0.3 | 28 | 11.90 | 0.92 |
| 22 | SF2-FK3 | 0.183 | 0.2 | 22 | 31.92 | 1.59 |
| 23 | FK3-LF7 | 0.111 | 0.3 | 8 | 24.28 | 0.93 |
| 24 | SK6-K10 | 0.112 | 0.3 | 97 | 0.01 | 1.08 |
| 25 | SSK3-KF50 | 0.083 | 0.7 | 108 | 0.04 | 0.91 |
| 26 | LaK8-SSK1 | 0.095 | 0.7 | 39 | 0.08 | 0.15 |
| 27 | LaK21-K50 | 0.117 | 0.2 | 17 | 0.08 | 1.12 |
| 28 | LaKN7-BaK5 | 0.094 | 0.7 | 21 | 0.13 | 0.82 |

Thus, there has been disclosed a glass product produced by combining at least two glasses of different refractive indices to form an optical body free of discontinuities. Various changes and modifications of an obvious nature will be apparent to those of ordinary skill in this art, and all such changes and modifications are deemed to fall within the scope of the invention, as defined by the appended claims.

What is claimed is:

1. A product produced by combining at least two different glass compositions of substantially different refractive indices to form an optical body substantially free of discontinuities and interfaces and having two substantially parallel surfaces, a first surface having a first composition substantially uniform thereacross and a second surface having a second composition substantially uniform thereacross, with a variation in composition from said first surface to said second surface and a concomitant change in index of refraction from said first surface to said second surface along an axis therebetween.

2. The product of claim 1 additionally having at least one of the following properties substantially constant from said first surface to said second surface: thermal coefficient of expansion, glass fusion temperature, Abbé value, and density.

3. The product of claim 1 having a change in refractive index from said first surface to said second surface of at least about 0.08.

4. The product of claim 1 wherein said change in refractive index is sufficiently smooth from said first surface to said second surface.

5. The product of claim 4 wherein said change in refractive index is substantially linear from said first surface to said second surface.

6. The product of claim 4 wherein said change in refractive index is substantially quadratic from said first surface to said second surface.

7. The product of claim 1 wherein said change in refractive index is parallel to an optic axis therein.

8. The product of claim 1 wherein said change in refractive index is normal to an optic axis therein.

* * * * *